UNITED STATES PATENT OFFICE.

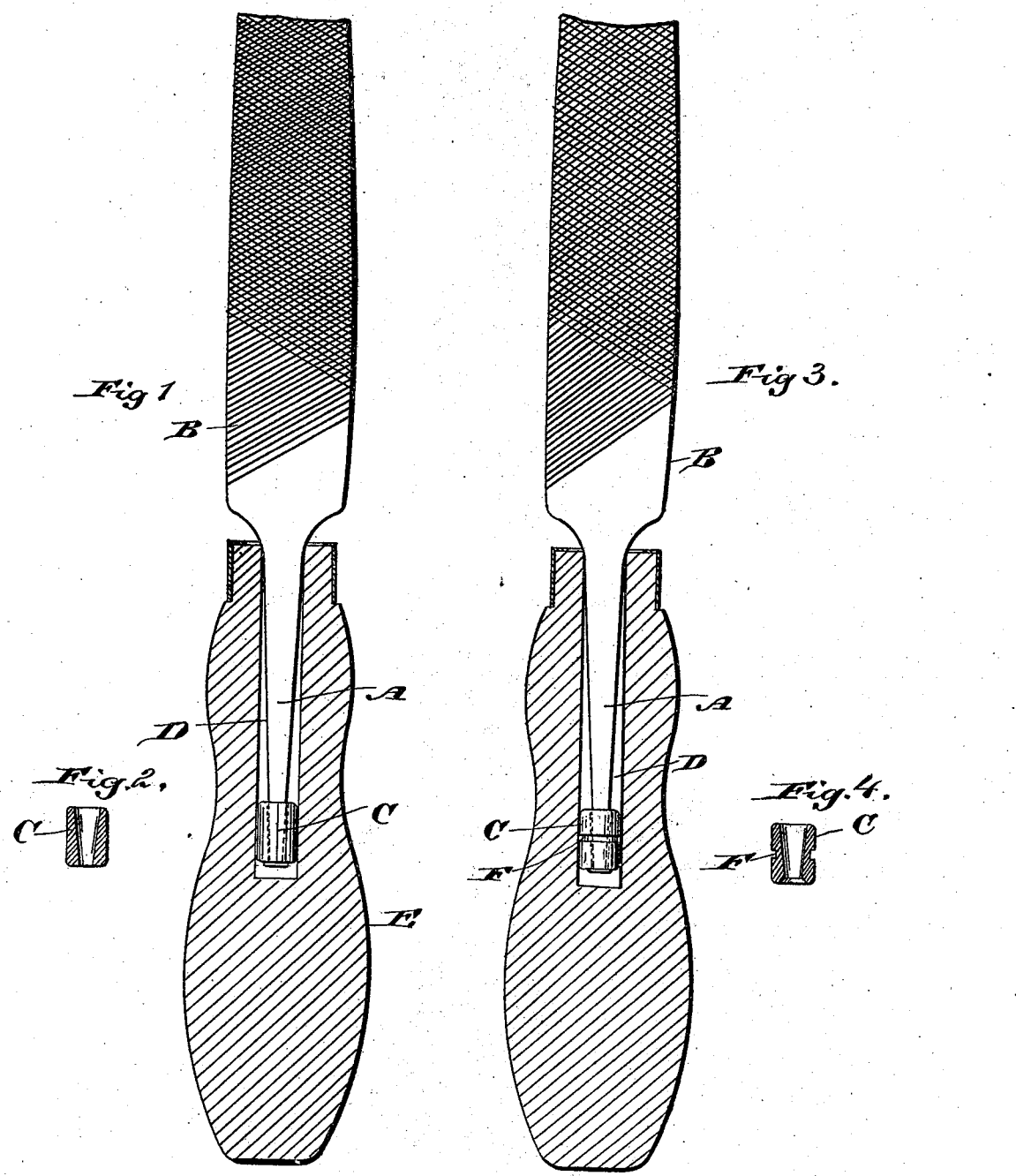

ROBERT DOUGLAS, OF FALL RIVER, MASSACHUSETTS.

TOOL-FASTENING.

SPECIFICATION forming part of Letters Patent No. 502,708, dated August 8, 1893.

Application filed June 9, 1892. Serial No. 436,040. (No model.)

*To all whom it may concern:*

Be it known that I, ROBERT DOUGLAS, of Fall River, in the county of Bristol and State of Massachusetts, have invented a new and Improved Tool-Fastening, of which the following is a full, clear, and exact description.

The object of my invention is to provide an improvement in means for securing files and certain other tools to wooden handles. Nuts or screw-threaded plugs have been applied to the tangs of files and similar tools for this purpose, and so have disks of horn, rubber or other elastic material. The nut or screw threaded plugs could not, however, be driven into the longitudinal bore formed in a handle and the elastic disks afforded no secure fastening—since they allowed the tool a certain lateral "play"—besides being unable to resist strong longitudinal tension on the handles. To overcome these and other de- defects of such fastening devices, I have conceived and practically applied the device hereinafter described and shown in accompanying drawings, in which—

Figure 1 is a sectional side elevation of the improvement as applied. Fig. 2 is a sectional side elevation of the collar. Fig. 3 is a sectional side elevation of a modified form of the improvement; and Fig. 4 is a sectional side elevation of the collar for the modified form.

The tapering shank A of the tool B carries on its end a hard metal collar C, fastened thereto by riveting the extreme outer end of the shank after the collar is in place, as will be readily understood by reference to Fig. 1.

The bore of the collar C corresponds to the shape of the shank so that when the shank is riveted, the collar is securely held in place to prevent it from slipping up or down on the shank and also prevent it from turning. The collar C is adapted to be driven with the shank A into a recess D, formed in the handle E, the said recess being cylindrical, and about of the same diameter as the collar C, so that when the latter is driven into the recess it fits snugly therein.

If desired, an annular recess F, may be formed exteriorly in the collar C, as shown in Figs. 3 and 4, so that the wood of the handle may expand into the said annular recess after the collar C has been driven home in the handle, so as to prevent displacement of the collar in the handle. In order to conveniently drive the collar C into position in the handle E, the ends of the collar are slightly rounded off, as will be readily understood by reference to the drawings.

The recess D is of sufficient depth to admit the entire length of the shank A of the tool, the outer end of the handle being bound by the usual ferrule, as shown in the drawings. The outer end of the recess D is engaged by the upper end of the tapering shank A so that the latter is securely held in place in the handle and turning of the tool B or disengagement from the handle is prevented.

The fastening device C is cheap and durable and forms a secure fastening which is easily applied. It may however be removed, in case of necessity, by application of a due degree of force.

Having thus fully described my invention, I claim as new and desire to secure by Letters Patent—

1. The combination with the tool having a tapering shank, of the cylindrical hard metal collar C having smooth tapering bore fitting the lower end of the shank and provided with rounded edges; the extremity of the shank being upset or riveted over the lower end of the collar to secure the said collar permanently in place, substantially as set forth.

2. The combination with the tool handle having a bore D, of the tool having a flat tapering shank A the upper wide portion of which fits the upper end of the bore to prevent turning, and the cylindrical hard metal collar C having a tapering bore receiving the lower end of the tang and rounded at its upper and lower edges to facilitate entrance and exit of the collar into and out of the bore; the lower end of the shank being upset or riveted over the collar to permanently secure it in place, substantially as set forth.

ROBERT DOUGLAS.

Witnesses:
DAVID P. KEEFE,
CHESTER W. GREENE, 2d.